United States Patent [19]

Flaig et al.

[11] Patent Number: 4,528,486
[45] Date of Patent: Jul. 9, 1985

[54] CONTROLLER FOR A BRUSHLESS DC MOTOR

[75] Inventors: Terrance L. Flaig, Tukwila; Gavrik Peterson, Seattle, both of Wash.

[73] Assignee: The Boeing Company, Seattle, Wash.

[21] Appl. No.: 566,588

[22] Filed: Dec. 29, 1983

[51] Int. Cl.³ .............................................. H02P 6/02
[52] U.S. Cl. .................................. 318/254; 318/138; 318/439
[58] Field of Search .................. 318/138, 254 A, 254, 318/439, 563

[56] References Cited

U.S. PATENT DOCUMENTS

| | | | |
|---|---|---|---|
| 3,403,316 | 9/1968 | Connant, Jr. | 318/599 X |
| 3,525,029 | 8/1970 | Joslyn et al. | 318/599 |
| 3,560,829 | 2/1971 | Brennan | 318/599 |
| 3,586,953 | 6/1971 | Markkanen et al. | 318/254 X |
| 3,644,808 | 2/1972 | Favre | 318/138 |
| 3,678,358 | 7/1972 | Kolatorowicz | 318/254 |
| 3,764,869 | 10/1973 | Woodbury | 318/254 X |
| 3,866,099 | 2/1975 | Bourbeau | 318/254 |
| 4,035,700 | 7/1977 | Kawasaki et al. | 318/254 X |
| 4,052,647 | 10/1977 | Thompson | 318/139 |
| 4,059,790 | 11/1977 | Kennel | 318/689 |
| 4,146,801 | 3/1979 | Vali et al. | 318/563 X |
| 4,208,621 | 6/1980 | Hipkins et al. | 318/254 X |
| 4,238,717 | 12/1980 | Knight et al. | 318/254 X |
| 4,270,868 | 6/1981 | Morgan et al. | 318/599 X |
| 4,282,471 | 8/1981 | Budniak et al. | 318/138 X |
| 4,312,033 | 1/1982 | Sweeney et al. | 318/599 X |
| 4,356,437 | 10/1982 | Saito et al. | 318/254 |
| 4,358,720 | 11/1982 | Abe | 318/254 |
| 4,368,411 | 1/1983 | Kidd | 318/254 |

FOREIGN PATENT DOCUMENTS

54-97722  8/1979  Japan ................................ 318/138

*Primary Examiner*—William M. Shoop
*Assistant Examiner*—Bentsu Ro
*Attorney, Agent, or Firm*—Christensen, O'Connor Johnson & Kindness

[57] ABSTRACT

A controller for regulating the current applied to the windings of a brushless DC motor by pulse width modulating transistors arranged in a six-switch bridge. Current feedback signals are obtained from sense resistors provided in the lower legs of the bridge circuit and are employed to generate a loop error signal. A bilateral arrangement of hysteresis comparator circuits monitors the current feedback signals and provides signals that disable the transistor switches when the current is sensed to be in excess of a safe level of operation for the transistors. The shutdown circuit continues its disablement of the transistors until the current is sensed to fall back within the designed range of control. To ensure smooth transition between regenerating and motoring modes, a circuit monitors both positive and negative excursions of the integrated error signal. When the error signal is sensed to exceed the operating range of the pulse width modulation circuitry, the sense of the motor excitation is reversed in order to produce the desired motor torque. An absolute value circuit enables the use of both positive and negative values of the error signal to control the production of pulses by the pulse width modulation circuit.

21 Claims, 5 Drawing Figures

CONTROLLER FOR A BRUSHLESS DC MOTOR

BACKGROUND OF THE INVENTION

The present invention relates generally to control systems for electric motors and, more particularly, to a controller for regulating the magnitude and direction of the torque of a brushless DC motor in response to a low-level torque command signal.

Brushless DC motors are widely used in servocontrol applications. Typically, the motors used in these applications are controlled by commutating the current supplied to the stationary windings. Rotor position sensors are usually included as an integral part of the motor and provide the controller with signals that indicate the position of the rotor magnets relative to the stator windings. To achieve high efficiency, control of the motor current is accomplished by pulse width modulating solid state switches, usually power-switching transistors. This current regulation technique is, however, difficult to control since the relationship between motor current and pulse width is complex and highly nonlinear. Current control is further complicated by the wide range of motor velocity and back EMF.

If the motor and controller are to form the basis of a servocontrol system, it is highly desirable that the nonlinearity attributable to the switching mode nature of the current regulation technique be eliminated. Approaches aimed at this objective have typically enclosed the pulse width modulator and transistor switches within a feedback loop, with a current-sensing circuit being added to provide a feedback signal for this current control loop.

To implement a position servo, it is necessary to further provide both position and velocity feedback loops to obtain suitable performance. For high-quality applications, the performance of the position and velocity feedback circuits are critical to the ultimate performance of the complete control system. This requires that the controller maintain a linear relationship between the output torque and the commanded torque in all four of the so-called quadrants, or modes, of motor operation. These quadrants correspond to the four possible combinations of speed and torque produced by the motor when operating either as a motor or a generator and rotating in either a clockwise or counterclockwise direction. For high performance, the control system must respond quickly to torque commands and maintain a linear torque relationship independent of the "external" effects of supply voltage and motor speed. It is particularly important that the controller be capable of maintaining linear control while smoothly effecting a transition from one quadrant of operation to another.

In servocontrol applications, there is often a current command signal having positive and negative values corresponding to the desired direction of motor torque. For example, positive and negative command signals may correspond to desired clockwise and counterclockwise torque. For smooth, efficient control, it is necessary to provide the commanded clockwise or counterclockwise torque quickly and without regard to whether the motor is rotating clockwise or counterclockwise when the command is given, i.e., the controlled current output should be independent of the "direction" or polarity of the motor velocity. Where the nature of the command requires the controller to change operation from motoring or regenerating in one direction to the opposite mode in the same direction (e.g., from motoring in a clockwise direction to regenerating in a clockwise direction), a fairly smooth transition can be made by responding to the sudden reversal in the polarity of the loop error signal. When, however, the nature of the desired torque is such as to require a change from a regenerating mode in one direction to a motoring mode in the other direction (e.g., from regenerating in a clockwise direction to motoring in a counterclockwise direction), there is a problem created by the required change in the direction of the motor velocity. In particular, there is the problem of sensing when it is necessary to change the excitation of the motor in order to effect a smooth transition to operating in the reverse direction. This change in excitation must be made before the motor actually reverses its direction of rotation in order to assure a smooth transition and produce the desired torque.

To ensure reliability of the power-switching transistors, it is desirable to provide a safety circuit that will turn off all of the transistors (regardless of the demands of the current control loop) if transient conditions should momentarily allow the current to exceed the operating limit of the transistors. When the out-of-limit current condition no longer exists, it is necessary to signal the controller to assume operation and provide power to the switching transistors. Prior approaches to providing this resumption of control have typically employed a timer that cuts off power to the transistors in response to an out-of-limit signal and signals the controller to resume operation after expiration of a preset time. Since the duration of the over-current condition does not necessarily coincide with the preset interval during which power is off, undesirable limit cycles are introduced by these protection circuits.

The feedback current against which the command signal is measured to derive the error signal is typically obtained through the employment of complex, and hence costly, magnetically coupled sensors.

The present invention provides a motor controller that regulates the current applied to the windings of the motor in a manner such that linear control of the motor output torque is consistently provided in all four quadrants of motor operation. An important aspect of the invention is the provision of a circuit that assures smooth operation by determining when it is necessary to change the motor excitation (i.e., the excitation sequence of the windings) in order to produce the desired motor torque. In accordance with this aspect of the invention, smooth transitions from one mode of operation to another (particularly from a regenerating mode in one direction to a motoring mode in the other direction) are effected by a circuit that monitors the pertinent parameter, the current error signal, rather than an approximation of what is required.

A further aspect of the invention is the provision of a safety shutdown circuit that inhibits the delivery of power to the switching devices only for as long as is required to allow the current to fall back into a safe, controllable range.

SUMMARY OF THE INVENTION

In accordance with the invention there is provided a controller for regulating the current applied to the windings of a brushless motor. The invention utilizes a single motor current feedback loop to control switching devices that selectively connect the windings of the motor with a source of power. The loop error signal is generated by comparing a current command signal representing a desired motor torque with a selected operating current through the windings of the motor. In accordance with a preferred aspect of the invention, the switching devices are transistors arranged in a bridge circuit across the electric power source. With this arrangement, current sense resistors in the lower legs of the transistor bridge circuit (i.e., in series connection with the transistors and the negative terminal of the power source) sense the operating current that is fed back and selected for comparison with the command signal.

In response to the error signal, a pulse width modulator circuit provides a pulse width signal that is used to control the duty cycle of the switching devices. In accordance with an aspect of the invention, an absolute value circuit is provided to enable modulation of the pulse width modulator with both positive and negative values of the error signal.

To provide smooth transition between modes of motor operation, a speed polarity circuit monitors the integrity of the current regulation loop and implements an adaptive system of motor speed sensing. In a preferred form, the speed polarity circuit continuously measures the error signal relative to the operating range of the pulse width modulator circuit. A buildup of the error signal beyond the limits of the operating range of the pulse width modulator circuit signifies that the excitation of the motor is incorrect for the development of the desired (commanded) motor torque. As long as the error signal remains within the operating range of the pulse width modulator, the speed polarity circuit provides a signal that indicates that the motor velocity is adequate for the required motor torque. However, as soon as it is detected that the error signal has exceeded the operating range of the pulse width modulator circuit, the speed polarity circuit alters the motor excitation in order to provide the current that is then required to produce the desired motor torque. In a preferred embodiment of the invention, the speed polarity circuit includes two comparators, one for monitoring negative values of the error signal and one for monitoring positive values of the error signal. A logic circuit provides the proper speed polarity in response to the outputs of these two comparators.

To prevent failure of the switching devices, a safety shutdown circuit monitors all of the operating currents through the windings of the motor. When any one of these currents is sensed to exceed a predetermined limit, the safety shutdown circuit generates a cut-off signal that indicates the out-of-limit condition. Responsive to this cut-off signal, the controller inhibits the delivery of drive power to the switching devices. After cut-off, the shutdown circuit continues to monitor the current flows through the windings of the motor. When these currents are sensed by the shutdown circuit to fall to a level that can be safely provided by the switching devices, the cut-off signal is discontinued. In the preferred embodiment, the upper and lower threshold points for cut-off are selected so that the upper limit falls below the rated limit of the switching devices while the lower limit falls just back within the designed control range for the remainder of the control circuitry. In this embodiment, a selector circuit selects the most positive and most negative operating currents and provides them to a bipolar hysteresis comparator circuit, the preset limits of which control the generation and duration of the cut-off signal.

A commutation control circuit controls the switching devices in accordance with the pulse width signal, the error signal, the speed polarity signal, and a rotor position signal received from a rotor position sensor associated with the motor. In the preferred embodiment, these signals are supplied via latches as address inputs to a read-only memory (ROM). To ensure integrity of the commands to the switches, the ROM is programmed to compare a current sample of the control signals with a sample of the signals stored during the previous sample period and to momentarily disable all of the switching devices if the samples do not compare favorably. The output from the ROM is decoded into signals that selectively enable the switches that are required to provide the correct current path through the windings of the motor in order to produce the desired torque. According to the preferred control technique, selected transistors are turned on while selected other transistors are pulsed with a duty cycle determined by the pulse width signal.

BRIEF DESCRIPTION OF THE DRAWINGS

The foregoing aspects and other features of the invention can best be understood by the following portion of the specification taken in conjunction with the accompanying drawings in which.

DETAILED DESCRIPTION OF THE INVENTION

Figure 1:
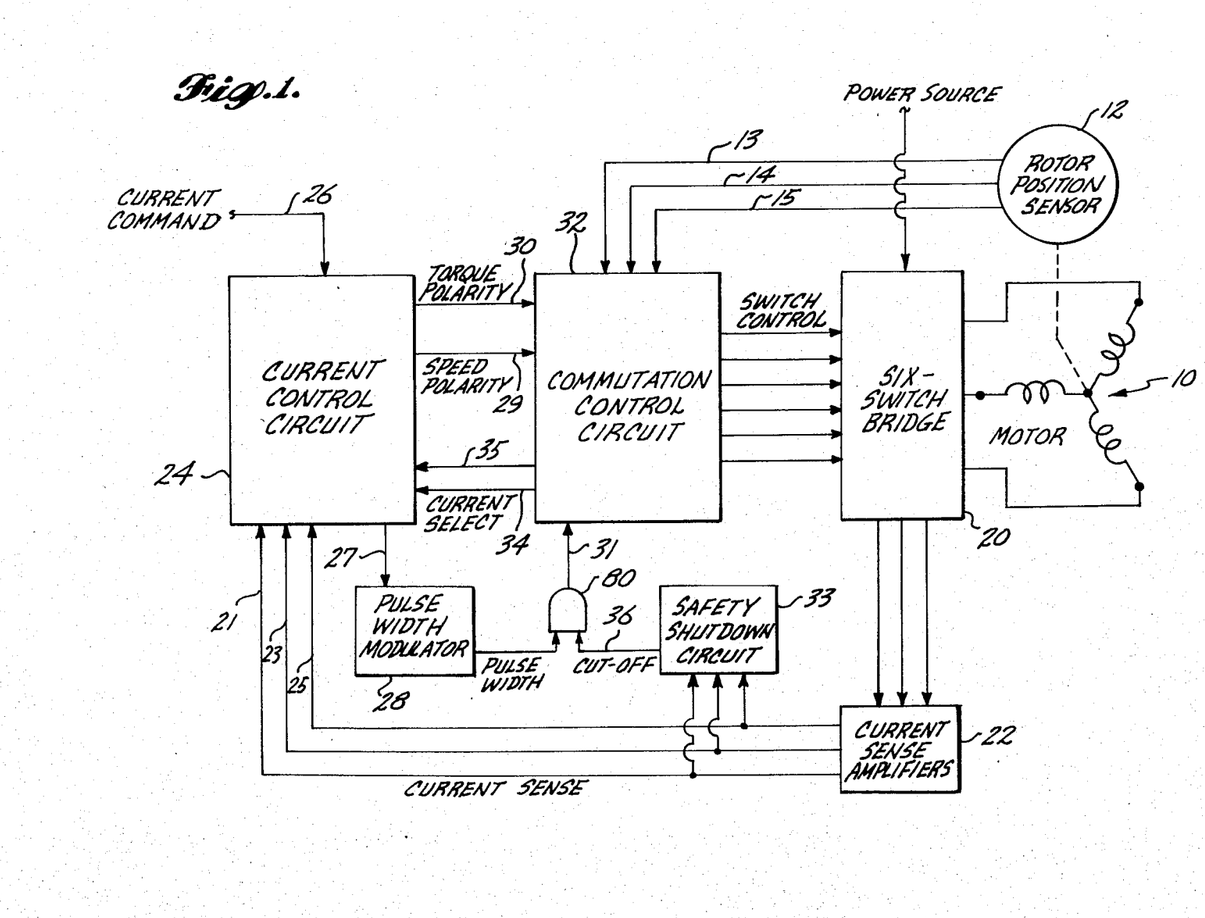
FIG. 1 is a block diagram of the inventive controller shown schematically connected to a brushless DC motor.

Referring initially to FIG. 1, there is shown a simplified block diagram of a controller constructed in accordance with the invention for regulating the flow of current to a DC brushless motor 10. The motor includes a rotor position sensor, or shaft position encoder, 12 that provides rotor position signals as three bits of information along lines 13, 14, and 15. The controller includes a six-switch bridge 20 that uses six switching power transistors to sequentially connect the motor stator windings across the power source in order to produce the required voltage and current sequence in the motor windings. The controller further includes current sense amplifiers 22 that receive and amplify motor current signals obtained from the six-switch bridge 20. The amplified signals are sent as current sense signals (representing actual operating currents through the windings of the motor) to a current control circuit 24. The current control circuit processes the motor current data in the form of the current sense signals received along lines 21, 23, and 25 and a current command signal received along line 26 that represents the desired magnitude and polarity of the torque from the motor. As will be explained more fully hereinafter, the current control circuit includes an error signal-generating circuit for generating an error signal proportional to the difference between the current command signal and a selected one of the current sense signals. In accordance with the error signal, the current control circuit provides a signal along line 27 to control the pulse width modulator 28 and informational signals along lines 29 and 30, which represent the desired torque polarity (torque polarity signal) and the speed polarity (speed polarity signal) required to produce the desired motor torque.

A commutation control circuit 32 processes the torque polarity and speed polarity signals derived by the current control circuit and the rotor position signals received from the rotor position sensor to determine which elements of the bridge must be activated. The commutation logic also regulates the switch "on" time in accordance with a control signal that is received along line 31. This control signal is a combination of signals that are derived from the pulse width modulator 28 (for current control) and a safety shutdown circuit 33 (for protection of the switching power transistors).

Figure 2:
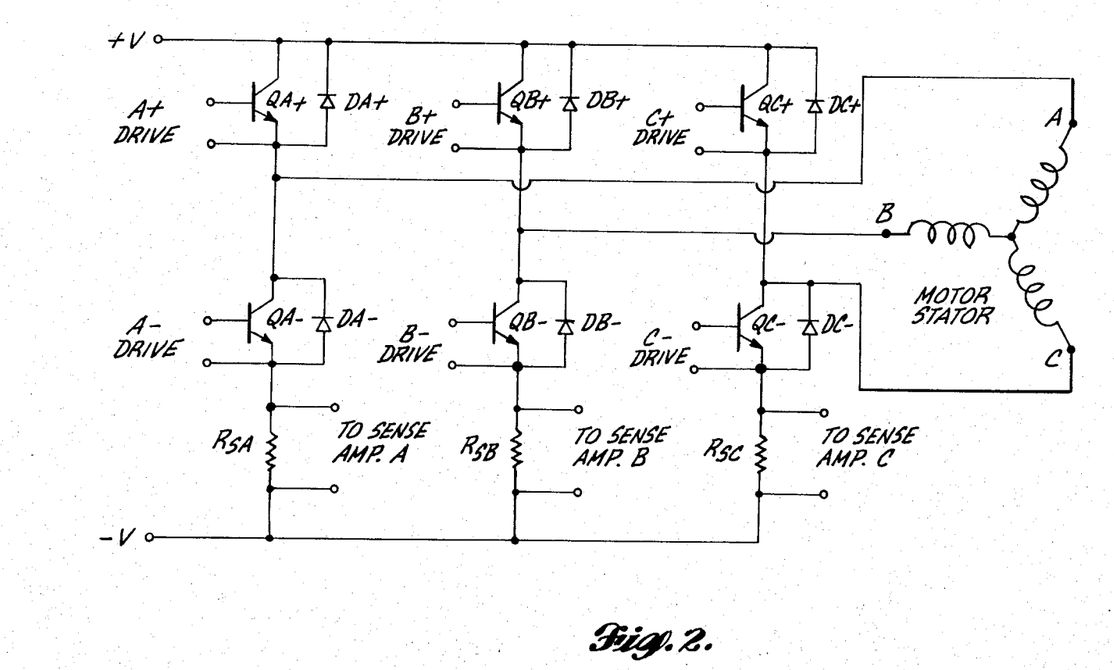
FIG. 2 is a simplified schematic diagram of the six-switch bridge circuit of FIG. 1 showing its connection with the stator windings of the motor.

With reference to FIG. 2, commutation of the motor stator windings is effected through a bridge circuit consisting of six switching power transistors, each with a fly-back diode, arranged in pairs as three "totem pole" structures across the main power source. The center of each totem pole is connected to a selected one of the windings of the motor stator. In FIG. 2 it will be seen that each of the "positive" power transistors, designated QA+, QB+, and QC+, have their collectors connected to the positive terminal of the main DC power source (designated +V) and their emitters connected, respectively, to the terminals A, B, and C, respectively, of the three rotor windings. The "negative" transistors of each pair, designated QA−, QB−, and QC−, each have their collectors connected to the rotor winding terminals, A, B, and C, respectively. The emitter of each of the negative transistors, QA−, QB−, and QC−, is connected to the negative terminal of the power source (designated −V) through a current sense resistor, $R_{SA}$, $R_{SB}$, and $R_{SC}$, respectively. Although schematically shown in FIG. 2 as single transistors, it is preferred that composite power Darlington transistor circuits be employed as the switch transistors.

As will be explained in connection with FIG. 3, the commutation control circuit provides control signals that selectively energize the transistor switches of the bridge to provide a current path through a selected pair of the motor windings. When, because of the size of the load, the bridge must switch high voltages, it is necessary to provide floating drivers for the power transistors. The present invention is ideally suited for such high-power applications. The pair of terminals shown for each driver in FIG. 2 illustrates the connection of the floating drivers required for operating the controller in a high-voltage environment.

To provide the required current path through the selected pair of windings in a selected direction, one of the positive transistors and one of the negative transistors are made conductive. The preferred mode of operation is to turn on one of the negative transistors and then pulse one of the positive transistors to obtain the desired current. For example, if the motor is being operated in a motoring mode and a current is required to flow from terminal A to terminal C, QC− is turned on and QA+ is pulsed on and off with a duty cycle determined by the pulse width signal derived from the pulse width modulator 28. As will be explained more fully hereinafter in connection with FIG. 4, the duration of the pulse width signal is provided in accordance with the error signal derived by the current feedback loop. The sequences in which the successive pairs of positive and negative transistors are energized to commutate the motor will be readily understood by those skilled in this art. It will be appreciated that modes of operation other than the preferred one described above (negative transistors on and positive transistors pulsed) may be employed. Thus, for example, one of the positive transistors could be turned on and one of the negative transistors pulsed. Alternatively, the pulses could be supplied to each of the selected negative and positive transistors.

In the regenerating modes of operation, where the motor is being turned by the load, all of the positive transistors are off, and selected ones of the lower transistors are pulsed to control the generated current. In this mode, for the pair of windings between terminals A and C, the current flows from terminal A through the windings to terminal C, then through the conductive QC− transistor and sense resistor $R_{SC}$, then upward through the sense resistor $R_{SA}$, and, finally, through the fly-back or commutation diode DA− back to terminal A. To regulate the current, QC− is pulsed in accordance with the error signal derived from the comparison of the torque command signal with the feedback signal obtained from the sense resistor $R_{SC}$.

In addition to providing a current path for control of the motor in the regenerating mode, the commutation diodes (DA+, DB+, DC+, DA−, DB− and DC−) also provide the current paths required to permit the current that is produced by the inductance of the windings to continue to flow when the transistors are turned off. For example, in the motoring mode with the current flowing from terminal A to terminal C, when the pulse transistor QA+ is turned off, the induced current continues to flow down into the ground leg through QC− and $R_{SC}$, then up through $R_{SA}$ and DA− and back to terminal A. The provision of these current paths when the pulse transistors are turned off will be appreciated as being required to protect the power transistors from excessive voltages when they are turned off.

Figure 5:
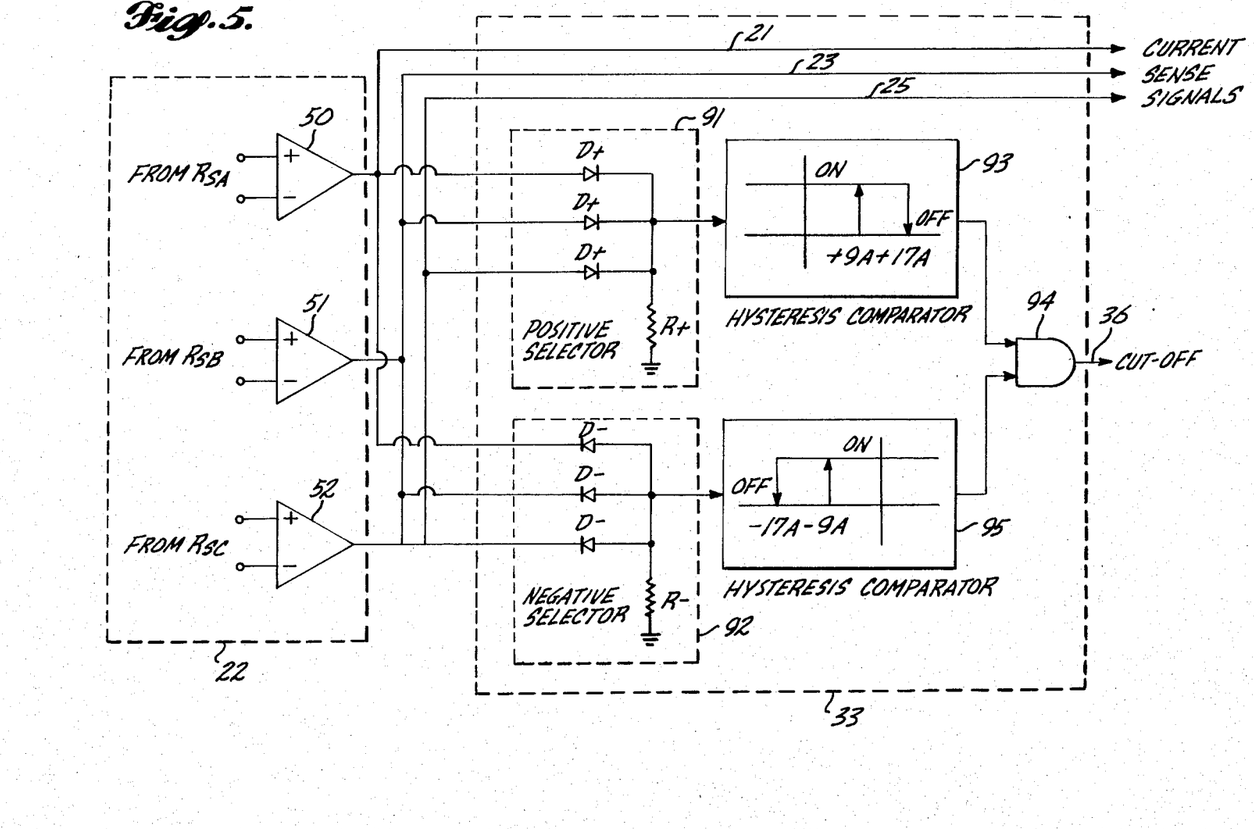
FIG. 5 is a detailed block diagram of the current sense amplifiers and safety shutdown circuit of FIG. 1.

The operating current flowing through the windings is observed by measuring the voltage across the appropriate current sense resistor. In contrast to known arrangements in which the motor current is sensed for feedback purposes by complex in-line floating current sensors, the present invention advantageously senses the current for feedback in the return legs of the transistor bridge circuit. As shown in FIG. 1, the voltages across the current sense resistors are amplified by the current sense amplifiers 22 and provided as current sense signals to the current control circuit 24 and safety shutdown circuit 33. As illustrated in FIG. 5, the current sense amplifiers consist of a group of three operational amplifiers that are configured as differential amplifiers 50, 51, and 52. The gain of the differential amplifiers 50, 51, and 52 and the value of the current sense resistors $R_{SA}$, $R_{SB}$, and $R_{SC}$, are selected so that the voltage output at each amplifier is directly proportional to the current flowing in the associated sense resistor (preferably 0.5 volts at the amplifier output for each ampere of current flowing in the resistor). These proportional voltages are fed as the current sense signals to the current control circuit 24 along lines 21, 23, and 25 (FIG. 1) and to the safety shutdown circuit 33. The operation of the safety shutdown circuit will be more fully discussed hereinafter.

Figure 4:
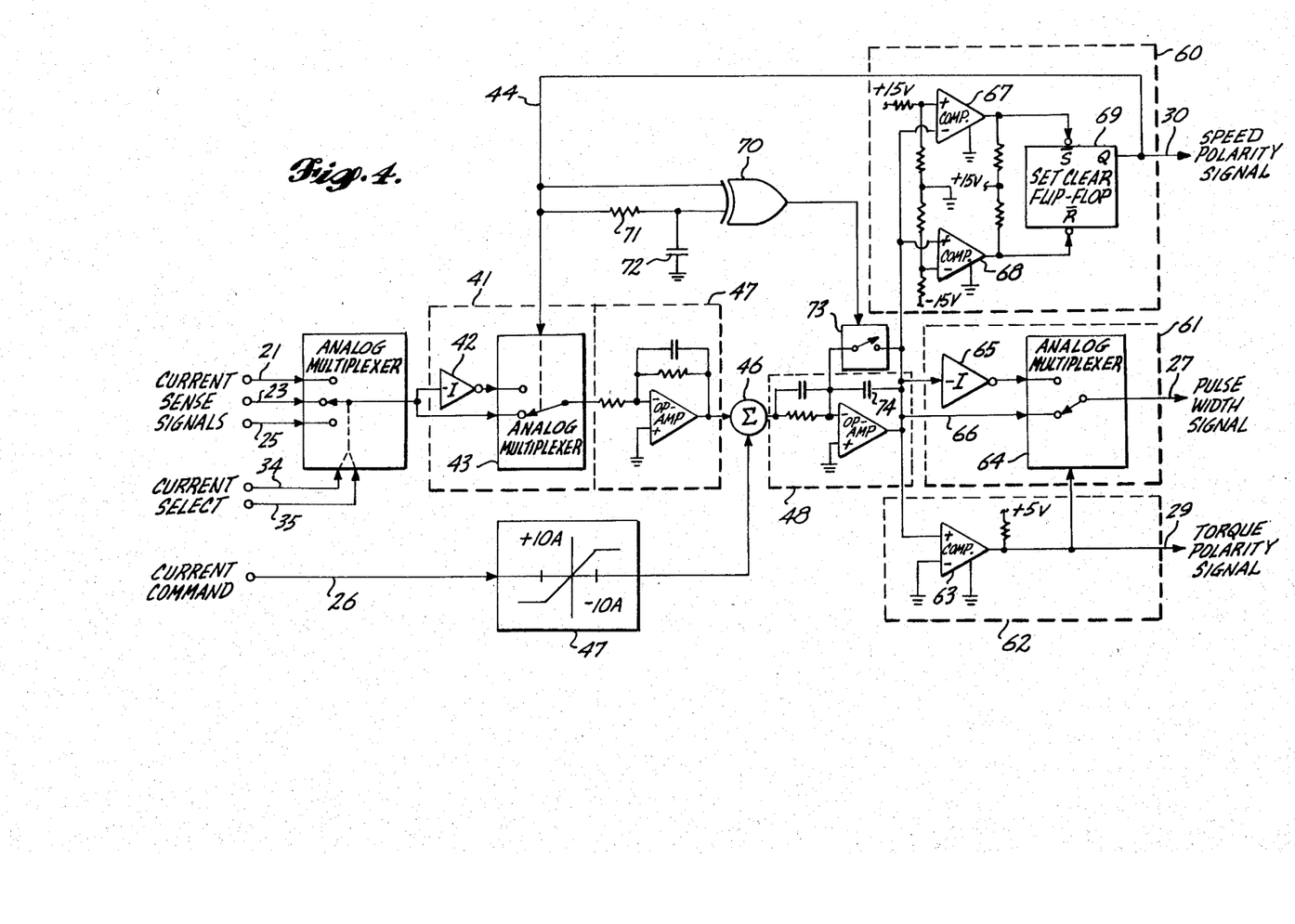
FIG. 4 is a detailed block diagram of the current control circuit of FIG. 1, showing the components of the error-generating circuit, the speed polarity circuit, and the absolute value circuit.

Referring now to FIG. 4, the current control circuit 24 of FIG. 1 is shown in greater detail. A current selector circuit selects one of the current sense signals on lines 21, 23, and 25 for ultimate comparison with a current command signal. The selection is made in accordance with a two-bit current select control signal supplied by the commutation control circuit along lines 34 and 35. The selection is made, of course, in accordance with the particular motor current that is being controlled at a given time. Although the current selector circuit may take a variety of forms, because of the availability of standard integrated circuit packages, it is preferred that the current selector circuit comprise an analog multiplexer 40 as illustrated in FIG. 4.

Since the operating currents through the windings and hence the sense resistors do not change directions between the motoring and regenerating modes, it is necessary to correct the polarity of the selected current sense signal before presenting it to the circuitry that generates the loop error signal. The correction of the polarity is provided by a polarity selector circuit 41 that includes an inverter circuit 42 and an analog multiplexer 43. In response to a speed polarity signal provided on line 44 (which indicates the correct polarity of the motor velocity required for the present motoring or regenerating mode of operation), the analog multiplexer 43 selects either the current sense signal with its normal polarity or the inverted representation thereof as provided by the inverter circuit 42. This operation thus assures that the polarity sense of the signal presented for comparison with the current command signal has the proper sense depending upon whether control is being affected in a motoring or regenerating mode. This appropriately selected and polarity-corrected signal is smoothed in a low-pass filter circuit 45, which is conventionally constructed. This filtering is provided to smooth the rough peaks of the generally triangular current waveform that is produced by the pulsing action of the transistors. The output of the low-pass filter is presented as the current feedback signal to a summing circuit 46.

The current command signal representing the desired torque is limited by current limiter 47 to ensure that no out-of-limit currents (i.e., in excess of the current ratings of the motor and transistors) are fed to the summing circuit 46, where the current feedback signal is subtracted from it. The resulting error signal is integrated by an error-integrating circuit 48 to obtain a voltage representing the loop error.

The integrated error signal is monitored by three command-generating circuits, a speed polarity circuit 60, an absolute value circuit 61, and a torque polarity circuit 62. The outputs of the speed polarity circuit 60 and torque polarity circuit 62 are provided as informational commands to the commutation control circuit along lines 29 and 30, respectively. The output of the absolute value circuit, in turn, is fed along line 27 to control the output of the pulse width modulator 28.

In the torque polarity circuit 62, a voltage comparator 63 compares the integrated error signal with ground and provides a digital torque polarity signal that indicates the desired motor torque, i.e., indicates the direction of the motor torque that is needed to provide the output requested by the input current command. The actual direction indicated by the state of torque polarity signal will be, of course, in accordance with the logic convention adopted for the commutation control circuit. With the connection shown in FIG. 4 for the input terminals of voltage comparator 63, a positive value for the integrated error signal produces a logical 1, while negative values of the integrated error signal produce a logical 0.

As will become more apparent hereinafter from the discussion of FIG. 3, the pulse width modulator circuit 28 is configured to receive only positive input signals. Since it is desirable, however, to utilize the actual error signal to control the pulse width modulator, regardless of whether the polarity is positive or negative, the invention advantageously provides the absolute value circuit 61 to enable control with negative values of the integrated error signal. To achieve this, the absolute value circuit includes an analog multiplexer 64 and an inverter amplifier 65. In response to the torque polarity signal, the analog multiplexer 64 selects either the present value of the integrated error signal (if the error is then positive) available on line 66 or an inverted representation of a negative integrated error signal that is available at the output of the inverter amplifier 65. Since the torque polarity signal has a positive (logical 1) sense for positive values of the error signal, the analog multiplexer directly feeds the current positive value of the error signal to the pulse width modulator. When, however, the integrated error signal is negative, the torque polarity signal is likewise negative (logical 0) and the multiplexer selects the output of inverter circuit 65, and, thus, provides a positive signal to the pulse width modulator. In this manner, the absolute value of the integrated error signal is always made available to the pulse width modulator circuit.

To provide smooth transition from one mode of operation to another, it is essential that the controller sense when it is necessary to change the motor excitation in order to produce the torque requested by the current command signal. There has been heretofore a problem of changing the excitation of the motor at the appropriate time relative to a reversal of the motor rotation to effect a smooth transition to the desired torque. A particular problem is presented when the required change is from a regenerating mode in one direction to a motoring mode in the other direction. In this change situation, the braking action of regeneration slows the motor in preparation for a direction reversal. To provide a smooth transition, it is necessary to effect the change in the excitation of the motor prior to the moment when the motor changes direction. In the present invention, the speed polarity circuit 60 senses the correct moment when it is necessary to change the excitation and, thereupon, signifies this required change by changing the sense of the speed polarity signal that is provided to the commutation control circuit. The speed polarity circuit accomplishes this direction sensing and correction function by monitoring the integrated error signal in relation to the allowable range of operation of the pulse width modulator circuit 28. An excursion of the error signal outside of this range, either in a negative or positive sense, indicates that inadequate motor current is being produced, in spite of the fact that the pulse width modulator is "fully open" providing its widest pulses. The speed polarity circuit senses this condition as an indication that the excitation of the motor is inconsistent with, and not producing, the required current. Stated differently, the speed polarity circuit senses this condition as indicating that, although torque is being commanded in a reverse direction, this required output is not being provided.

To sense out-of-range conditions of the error signal, the speed polarity circuit includes two comparators 67 and 68. The outputs of comparators 67 and 68 are fed as inputs to a set clear flip-flop 69, which, in response thereto, provides the speed polarity signal as an output. Comparator 67 senses positive excursions of the integrated error signal, comparing this signal to the positive reference signal maintained on the noninverting input. When the error signal exceeds this preset reference, the comparator provides an output signal that causes flip-flop 69 to set its output and provide a speed polarity signal of logic 1. Similarly, comparator 68 compares the negative excursions of the error signal against a negative reference potential applied to its inverting input and provides a signal that clears the output of flip-flop 69 to a logic 0 when a negative out-of-limit condition occurs.

The operation of this circuit can be further appreciated by the following example, which assumes that a change is to be made from motoring in one direction to motoring in the other direction. To initiate this reversal, the current command input changes polarity, as for example, from a positive value to a negative value. In response to this command, the error signal goes negative. In response to this negative error signal, the voltage comparator 63 and the torque polarity circuit change the sense of the torque polarity signal, signifying that the motor is now to be run in a regenerating mode. Since the error signal remains within the operating range as it changes from a positive value to a negative value, the speed polarity circuit 60 continues to provide the same speed polarity signal, i.e., a signal indicative of motoring (and regenerating) in the original direction. As the motor rotation decreases in response to the braking action of the regenerating mode, the output current of the motor begins to decrease. As the speed of rotation continues to fall, a point is reached at which the load is not driving the motor rapidly enough to produce the current required to satisfy the command. Since the feedback loop can no longer be satisfied, the error signal rapidly builds up (in this example in a negative direction) and exceeds the operating range of the pulse width modulator. When this occurs, comparator 68 senses the out-of-range condition and provides a signal that switches the output of flip-flop 69, which changes the direction (polarity) of the speed polarity signal, which, in turn, enables the commutation control circuit to energize the switching transistors to effect motoring in the opposite direction.

At the moment when the speed polarity signal is reversed, the integrated error signal has a large value. To prevent a sudden surge of current, a circuit is included to reset the error integrator 48 to zero whenever the speed polarity signal changes state. By thus resetting the integrator, the error signal will begin to build up again from zero. This action further helps to smooth the transition of the motor between modes of operation. This function is provided by an integrator reset circuit that includes an exclusive OR gate 70, an analog delay circuit consisting of resistor 71 and capacitor 72, and a switch 73. The speed polarity signal available on line 44 is provided as one input to gate 70. The RC time delay on the other input of gate 70 provides a momentary difference in the inputs to gate 70 whenever the speed polarity signal changes sense. Thus, gate 70 provides an output pulse whenever the speed polarity signal changes. This output pulse closes switch 73, which permits the charge on the feedback capacitor 74 on the error integrator to be dumped. The RC time constant is selected to provide a pulse that is wide enough to permit capacitor 74 to fully discharge and, hence, set the error signal to zero.

Figure 3:
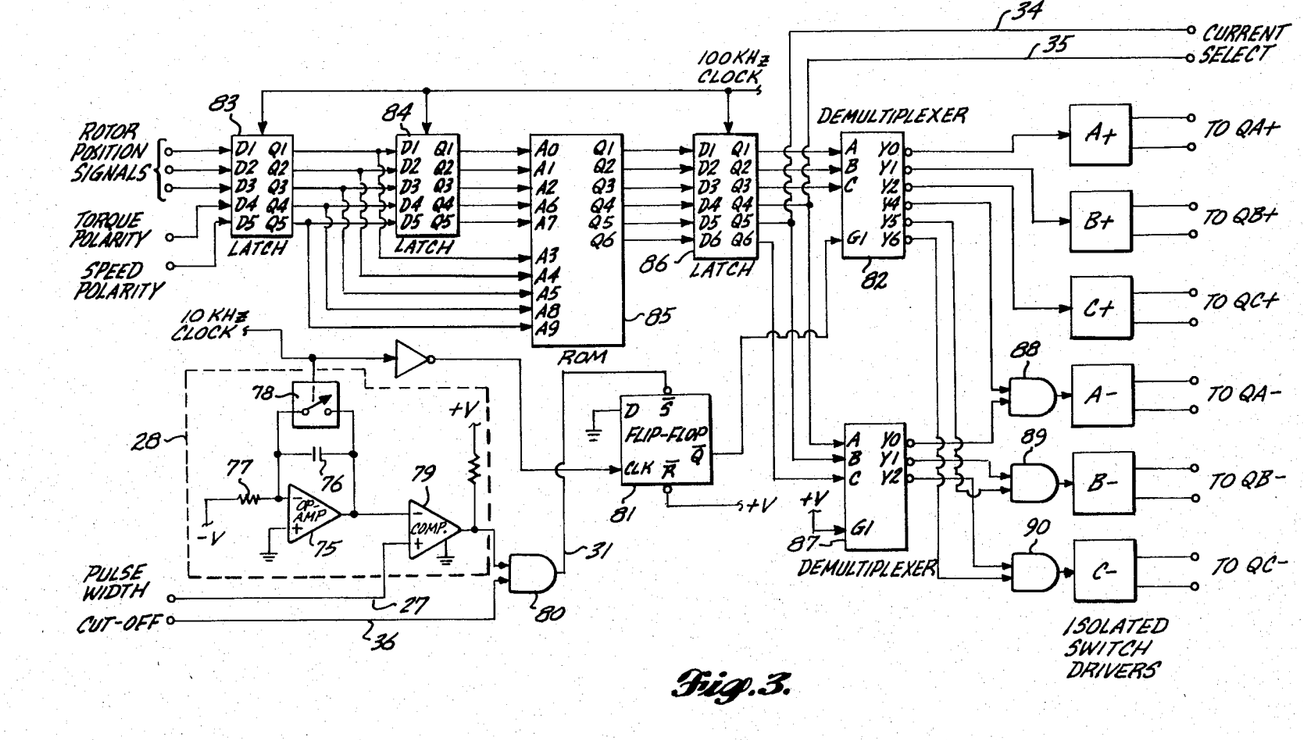
FIG. 3 is a detailed block diagram of the commutation control circuit and the pulse width modulator circuit of FIG. 1.

With reference now to FIG. 3, the commutation control circuit 22 and the pulse width modulator circuit 28 are shown in greater detail. The pulse width modulator circuit 28 is conventional, having an operational amplifier 75 configured as an integrator with a feedback capacitor 76, a resistor 77 connected to a DC source, and a switch 78 that resets the integrator in response to a 10 kHz clock signal provided by a systems clock, not shown. The sawtooth waveform produced by the integrator is provided as one input to comparator 79. The absolute value of the error signal is provided as a pulse width control signal on line 27 as the other input to comparator 79 and determines the duty cycle of the pulse output signal generated by the modulator. This pulse output signal is supplied as one input to AND gate 80. The cut-off signal developed by the safety shutdown circuit is supplied along line 36 as the other input to AND gate 80. Under normal, i.e., safe in-limit conditions, the cut-off signal is a logical 1, so that the pulses produced by the pulse width modulator circuit set flip-flop 81, the output of which is supplied as the "true" pulse width modulation signal that determines the duty cycle of the pulsed switching transistors. As will be discussed in greater detail hereinafter, when the safety shutdown circuit detects an out-of-limit current condition for the transistor switches, the cut-off signal goes low, "blocking" the transmittal of the pulse modulated signal through AND gate 80, and others, effectively providing no pulse signals for the transistors. Thus, whenever the cut-off signal goes low as a result of an over-current condition, all power to the transistors is switched off.

Flip-flop 81 is a D flip-flop with its D input tied permanently low. This flip-flop is clocked at the same 10 kHz rate as the pulse width modulator, and receives, on the overriding set input designated $\bar{S}$, the output of AND gate 80. Under normal operating conditions, the pulse signals produced by the pulse width modulator "pass through" AND gate 80 and are supplied to the set input of flip-flop 81. A duplicate of this signal appears at the $\bar{Q}$ output and is supplied to the data input of demultiplexer 82 and, subsequently, is supplied as a control signal to the transistor that is to be pulsed. The selective application of this control signal and the sequencing of the transistor switches are controlled by a series of latches, a read-only memory, and decoder circuits that include demultiplexer 82, all in response to the torque polarity and speed polarity signals developed in the current control circuit and the rotor position signals provided by the rotor position encoded associated with the motor.

The commutation control circuit functions by sampling the servo conditions (i.e., the state of the rotor position signals, torque polarity signal, and speed polarity signal) at a 100 kHz rate and storing this sample data in a pair of latches, 83 and 84. The data in the first latch thus represents the current state of these signals. During the next sample period, the data in the first latch 83 is transferred into the second latch 84 and the then-current condition of the signals is again stored in the first latch. Thus, at all times, at a 100 kHz sample rate, there is available data representing the current rotor position, torque polarity, and speed polarity, and the condition of these parameters during the immediately preceding sample period. These two samples of the servo data are applied to the address inputs (designated A0–A9) of a read-only memory (ROM) 85. As a safety measure, the ROM is preprogrammed to compare the current and previous samples of the input data and to momentarily cut off the drive to the transistors if the two samples of the input data do not agree. This safety measure is taken to ensure that the commutation logic is responding to valid input data rather than to unwanted transients. The memory is preferably programmed so that shutoff as a result of sample disagreement is only for one sample period, i.e., for ten microseconds. Since the switches are pulsed at the slower 10 kHz rate, there are ten sample periods for every switch period, thus providing sufficient time and opportunity to assess whether valid data is being provided.

The ROM is preprogrammed to provide the correct sequencing of the power-switching transistors in response to the information provided on the address lines. The output of the ROM, in the form of encoded switch control signals is stored in latch 86 and decoded by a pair of demultiplexers 82 and 87 and associated gates. Demultiplexer 82 receives the encoded instructions that determine which of the six transistors in the bridge is to be pulsed. These instructions are received from the latch into the inputs designated A, B, and C. On the data input designated G1, demultiplexer 82 receives the "true" pulse width modulation signal that controls the on cycle of the transistors. Demultiplexer 82, thus, selects, in accordance with the input instructions, one of the outputs designated Y0–Y6 and feeds the pulse width modulation signal to the appropriate one of the isolated switch drivers (designated A+, B+, C+, A−, B−, and C−) to turn on the proper transistor switch. It will be seen, thus, that demultiplexer 82 determines which of the six transistors is to be rendered conductive and the duration of that conduction. In the preferred manner of operation, one of the positive drivers (A+, B+, or C+) is energized in the motoring mode to pulse one of the positive transistors (QA+, QB+, or QC+), while one of the negative drivers (A−, B−, C−) is energized for the regenerating mode to pulse one of the negative transistors (QA−, QB−, or QC−).

Demultiplexer 87 controls the transistors that are turned continuously on. Since, in the preferred manner of operation, only the negative transistors in the lower legs of the bridge are turned continuously on (during motoring), the outputs of demultiplexer 87 are fed only to the three negative drivers, A−, B−, and C−. The three AND gates 88, 89, and 90 combine the "steady on" commands from demultiplexer 87 with the "pulse commands" from demultiplexer 82 for control of the three negative switch drivers, A−, B−, and C−, respectively. The "steady on" input signal for demultiplexer 87 is obtained by permanently tying the data input (G1) to a positive voltage. It is to be noted, of course, that the negative transistors are "continuously on", in accordance with the current required to produce the necessary torque in the desired mode of operation of the motor. Thus, during normal motoring, these transistors are on only until the motor rotates to a position that requires that a different transistor be energized to provide current through a different winding. Where, for example, the motor is rotating rapidly, the "constantly on" transistors would, in fact, be cycling on and off at a rate determined by the speed. On the other hand, where the motor is turning very slowly the negative transistors would be slowly cycling on and off. At another extreme, where the motor is holding a load in a given position, the negative transistors would be on all of the time for an indefinite period.

To protect the low-level commutation control circuitry, the drivers for the transistors provide isolation from the high-voltage realm of the transistor switches. Any suitable isolated switch driver may be employed to couple the low-level circuitry to the high-level floating circuitry of the transistor bridge. In a controller constructed in accordance with the invention, individual transformers were employed as the isolated switch drivers. It will be readily apparent that other devices, such as opto-couplers, will provide equally good performance.

In addition to controlling the commutation of the switching transistors, the encoded output of ROM 85 is employed to direct the analog multiplexer 40 in the current control circuit (see FIG. 4) to select the proper current for comparison with the command. This information is obtained from the Q4 and Q5 outputs of latch 86 and provided as current select signals along lines 34 and 35. As noted earlier, to develop the error signal, the command signal must be compared with the current through the presently energized coil. The command concerning this selection is conveniently obtained by using the instructional information derived from the ROM that indicates the specific pair of windings that is being energized for control of the current.

To control larger DC brushless motors, it is necessary to operate the switching transistors with high voltages and currents. Often, the transistors are driven near the borderline of their durability. To avoid catastrophic failure of the transistors and consequent failure of the servosystem, it is exceedingly important to protect the transistors from conditions, such as those caused by transients, that momentarily allow the currents to exceed the rated capacity of the transistors. Since all of the transistors are exposed to the risk of excessive currents, even when they are not participating in the control of motor current, it is necessary to, at all times, sense the currents flowing through all of the transistors. If any of these currents is sensed as being out of tolerance, the protective circuitry must immediately inhibit operation of all of the switching transistors. To maintain control over the movement of the load, it is equally important to resume the delivery of power to the transistors as soon as the overcurrent conditions have subsided. Typically, a timer-based technique has been employed to return power to the transistors once operation has been inhibited because of high current conditions. Thus, the transistors are disabled for a specific interval of time. This protective technique is not entirely desirable since the inhibit-triggering event may have a shorter duration than the predetermined inhibit period so that the load remains uncontrolled unnecessarily during the period of time between abatement of the condition and expiration of the inhibit period.

To overcome these disadvantages, and to provide resumption of control as soon as an out-of-limit condition subsides, the present invention provides a protective circuit that continues to monitor the currents flowing through the transistors even after the transistors have been inhibited. This is accomplished by a safety shutdown circuit that continuously monitors the currents flowing in the current paths provided through the various windings of the motor and selected ones of the switching transistors. When any one of these currents is sensed to be over a predetermined safe level of operation for the transistors, a cut-off signal is generated to interrupt the application of power to all transistors. This cut-off signal, and the disablement of all transistors, is maintained while the safety shutdown circuit continues to monitor the current flow. When the current is sensed to fall back to a predetermined safe level, power is once again applied to the transistors. Thus, the safety shutdown circuit provides two trigger levels, an upper threshold point that triggers shutdown, and a lower threshold point, which lies below the upper threshold point, and which signifies that the current has fallen to a level that can be controlled by the controller. The upper threshold point is determined by the rated capacity of the transistors, and is preferably chosen to be below the maximum rated current for the transistors. The lower threshold point is determined by the designed operating range of the current control circuitry. Preferably, the lower threshold point is chosen to fall below the maximum level of current that the control circuitry is capable of commanding.

In preferred form, the safety shutdown circuit employs a bilateral arrangement of hysteresis comparator circuits as shown in FIG. 5. The circuit is connected to the current sense amplifiers to receive the current sense signals that represent the currents flowing through the sense resistors $R_{SA}$, $R_{SB}$, and $R_{SC}$ in the lower legs of the transistor bridge circuit (see FIG. 2). A bilateral hysteresis comparator arrangement is employed since the currents flowing through the sense resistors have both positive and negative senses. Functionally, the safety shutdown circuit senses the magnitude of all of the currents flowing through the sense resistors and provides a cut-off signal if the sensed magnitude exceeds a preset upper limit, or threshold. A positive current selector circuit 91, comprising a network of three diodes designated D+ and a resistor designated R+, selects the current sense signal having the largest positive magnitude and supplies this signal as the input to a positive hysteresis comparator circuit 93. The upper limit, or threshold point, of the positive hysteresis comparator circuit 93 is set at a level that falls below the rated current for the power transistors. For transistors that are rated at 20 amperes, an upper threshold point of 17 amperes provides a good margin of safety. The lower threshold point for the positive hysteresis comparator circuit is set at a current level that is within the range of control of the rest of the control circuitry. For example, in a controller made in accordance with the invention, the control circuitry was designed to regulate current between plus and minus 10 amperes. In order to fall within this range of control, the lower threshold point was selected to be nine amperes. Thus, assuming that a positive current in excess of 17 amperes is sensed to be flowing through one of the current sense resistors $R_{SA}$, $R_{SB}$, or $R_{SC}$, the positive hysteresis comparator circuit 93 would respond to this out-of-limit current and provide an off command to an AND gate 94. The logic of the commutation control circuit is configured so that a logical 0, or low, on either input of AND gate 94 produces a cut-off signal that dictates disabling the power transistors. This shutdown state is maintained, i.e., comparator 93 continues to provide the low off command until the sensed current is seen to fall to the nine-ampere lower threshold level. When this occurs, the comparator returns to its normally on (high) state. The output of AND gate 94 changes state accordingly, and discontinues provision of the cut-off signal, restoring power to the transistors.

The negative selector circuit 92 operates in a similar fashion to select the current sense signal having the largest negative magnitude. This most negative signal is provided to negative hysteresis comparator circuit 95, which has its limits set in mirror fashion to comparator 93 in accordance with the operating limits of the power transistors and the designed range of control. Thus, for the example just discussed, the upper threshold point is set at −17 amperes while the lower threshold point is set at −9 amperes. When a negative current is sensed to exceed −17 amperes, comparator 95 switches low, causing AND gate 94 to provide the cut-off signal. When the current falls back within the control range to −9 amperes, comparator circuit 95 switches state, returning to its normally on, or high, state. This restores two high signals on the input of AND gate 94 and, thus, provides an indication to the commutation control circuitry that the currents are within the safe range.

The present invention has been described in relation to its preferred embodiment. One of ordinary skill, after reading the foregoing specification, will be able to effect various changes and substitutions of equivalents without departing from the broad concepts disclosed herein. It is therefore intended that the protection afforded by Letters Patent granted hereon be limited only by the definition contained in the appended claims and equivalents thereof.

The embodiments of the invention in which an exclusive property or privilege is claimed are defined as follows:

1. A controller for regulating the current applied to the windings of a brushless motor, said motor including a rotor position sensor, said controller comprising:
   switching devices for selectively connecting the windings of said motor with a source of electric power;
   an error signal circuit for generating an error signal proportional to the difference between a current command signal and a selected operating current through the windings of said motor;
   a pulse width modulator circuit, responsive to said error signal, to provide a pulse width signal, said pulse width modulator having a predetermined operating range;
   a speed polarity circuit to provide a speed polarity signal in response to said error signal and in accordance with the operating range of said pulse width modulator;
   a safety shutdown circuit connected to sense the operating currents through the windings of said motor and provide a cut-off signal when any one of said currents exceeds a predetermined upper level, said cut-off signal being provided until said current is sensed to fall to a predetermined lower level;
   a commutation control circuit for controlling the switching devices in response to said pulse width signal, said error signal, said speed polarity signal, and a rotor position signal received from the rotor position sensor, said commutation control circuit being operatively connected to inhibit operation of all of said switching devices in response to said cut-off signal.

2. The controller of claim 1, wherein said speed polarity circuit includes:
   a comparator for comparing the error signal with a predetermined positive reference signal;
   a comparator for comparing the error signal with a predetermined negative reference signal; and logic means for providing the speed polarity signal responsive to the output of said comparators.

3. The controller of claim 2, including reset circuit means operatively connected to detect a change in the speed polarity signal and, in response thereto, set the error signal to a zero level for a predetermined period of time.

4. The controller of claim 1, wherein said safety shutdown circuit comprises:
selector means for selecting the current sense signal having the largest magnitude; and
a hysteresis comparator circuit for providing the cut-off signal in response to the signal selected by said selector means.

5. The controller of claim 4, wherein said current selector means comprises:
a positive current selector circuit to provide an output signal indicative of the current sense signal having the largest positive magnitude; a negative current selector circuit to provide an output signal indicative of the current sense signal having the largest negative magnitude; and wherein,
said hysteresis comparator circuit comprises:
a positive hysteresis comparator circuit connected to receive the output of said positive current selector circuit; and
a negative hysteresis comparator circuit connected to receive the output of said negative current selector circuit; and
logic means connected to receive the outputs of said positive and negative hysteresis comparator circuit and provide said cut-off signal in response thereto.

6. The controller of claim 1, further including an absolute value circuit connected to provide the absolute value of said error signal to said pulse width modulator.

7. The controller of claim 6, wherein said absolute value circuit comprises:
an inverter circuit, said inverter circuit being connected to receive said error signal as in input and to provide an inverted representation thereof as an output signal;
a switch, said switch being operative to directly couple positive value error signals as input signals to said pulse width modulator circuit and operable to provide the output signal of said inverter circuit as an input signal to said pulse width modulator circuit when said error signal has negative values.

8. The controller of claim 7, wherein said switch is responsive to said error signal.

9. A controller for regulating the current applied to the windings of a brushless motor, said motor including a rotor position sensor, said controller comprising:
power means including switching devices for selectively providing motor drive current to the windings of the motor from an electric power source;
current sense means for providing current sense signals representative of the motor drive currents provided by the switching devices of said power means;
a current control circuit connected to receive said current sense signals and a command signal representing a desired motor torque, said current control circuit including
an error signal circuit for generating an error signal proportional to the difference between said command signal and a selected one of said current sense signals,
a torque polarity circuit, responsive to said error signal, to provide a torque polarity signal indicative of the desired motor torque, and
a speed polarity circuit, responsive to said error signal, to provide a speed polarity signal indicative of the motor excitation required to produce the desired motor torque;
a pulse width modulator circuit, responsive to said error signal, to produce a pulse width signal for controlling the duty cycle of the switching devices of said power switching means;
a safety shutdown circuit connected to detect said current sense signals, said shutdown circuit providing a cut-off signal when the magnitude of any one of said current sense signals exceeds a predetermined upper level, said cut-off signal being provided until the magnitude of said current sense signal is detected to fall to a predetermined lower level; and
a commutation control circuit for selectively providing switch drive signals to control said switching devices in response to said torque polarity signal, said speed polarity signal, said pulse width signal, and a rotor position signal received from the rotor position sensor, and commutation control circuit being operatively connected to inhibit operation of all of said switching devices in response to said cut-off signal.

10. The controller of claim 9, wherein said safety shutdown circuit comprises:
selector means for selecting the current sense signal having the largest magnitude; and
a hysteresis comparator circuit for providing the cut-off signal in response to the signal selected by said selector means.

11. The controller of claim 10, wherein said selector means comprises:
a positive current selector circuit to provide an output signal indicative of the current sense signal having the largest positive magnitude;
a negative current selector circuit to provide an output signal indicative of the current sense signal having the largest negative magnitude; and wherein
said hysteresis comparator circuit comprises:
a positive hysteresis comparator circuit connected to receive the output of said positive current selector circuit;
a negative hysteresis comparator circuit connected to receive the output of said negative current selector circuit; and
logic means connected to receive the outputs of said positive and negative hysteresis comparator circuits and provide said cut-off signal in response thereto.

12. The controller of claim 9, wherein there is a predetermined operative range for the error signal generated by said current control circuit, and wherein:
said speed polarity circuit includes means to change said speed polarity signal when the error signal exceeds the limits of said operative range.

13. The controller of claim 12, wherein said speed polarity circuit includes:
a comparator for comparing the error signal with a predetermined positive reference signal;
a comparator for comparing the error signal with a predetermined negative reference signal; and logic means for providing the speed polarity signal responsive to the output of said comparators.

14. The circuit of claim 13, including reset circuit means operatively connected to detect a change in the speed polarity signal and, in response thereto, set the error signal to a zero level for a predetermined period of time.

15. The controller of claim 9, wherein said switching devices are transistors arranged in a bridge circuit across an electric power source, said transistors being selectively connected to provide current paths between the source and the windings of the motor;

and wherein said current sense means includes current sense resistors, said resistors being connected in series with selected ones of said transistors and with the negative terminal of said power source so that each of said current paths passes through one of said resistors.

16. The controller of claim 9, wherein said commutation control circuit includes:

latch means for sampling and storing the rotor position signals, the torque polarity signals, and the speed polarity signals;

a preprogrammed memory device having address inputs connected to receive the rotor position signals, the torque polarity signals, and the speed polarity signals from said latch means, said memory device having data outputs operatively connected to control the switching devices.

17. The controller of claim 16, wherein said memory device is connected to receive a current sample of said signals and a preselected stored sample of said signals, said memory device being preprogrammed to compare the current sample of the signals with the stored sample of the signals and momentarily disable all of said switching devices if said samples are different.

18. The controller of claim 17, wherein said latch means samples and stores said signals during consecutive sample periods, and wherein said memory device is so connected and preprogrammed to compare the signals sampled during each sample period with the signals sampled during the immediately preceding sample period.

19. The controller of claim 9, further including an absolute value circuit connected to provide the absolute value of said error signal to said pulse width modulator.

20. The controller of claim 19, wherein said absolute value circuit comprises:

an inverter circuit, said inverter circuit being connected to receive said error signal as an input and to provide an inverted representation thereof as an output signal;

a switch, said switch being operative to directly couple positive value error signals as input signals to said pulse width modulator circuit and operable to provide the output signal of said inverter circuit as an input signal to said pulse width modulator circuit when said error signal has negative values.

21. The controller of claim 20, wherein said switch is responsive to said torque polarity signal.

* * * * *

UNITED STATES PATENT AND TRADEMARK OFFICE
CERTIFICATE OF CORRECTION

PATENT NO. : 4,528,486

DATED : July 9, 1985

INVENTOR(S) : Terrance L. Flaig et al.

It is certified that error appears in the above-identified patent and that said Letters Patent is hereby corrected as shown below:

Column 15, line 40: "in" should be --an--

Column 16, line 25: "and" should be --said--

Signed and Sealed this

Thirty-first Day of December 1985

[SEAL]

Attest:

DONALD J. QUIGG

Attesting Officer

Commissioner of Patents and Trademarks